(12) United States Patent
Morishita et al.

(10) Patent No.: US 9,248,442 B2
(45) Date of Patent: Feb. 2, 2016

(54) POROUS CARBON AND METHOD OF MANUFACTURING SAME

(75) Inventors: Takahiro Morishita, Osaka (JP); Yohko Nishi, Mitoyo (JP); Tomoyuki Ohkuni, Kanonji (JP)

(73) Assignee: TOYO TANSO CO., LTD., Osaka-shi (JP)

( * ) Notice: Subject to any disclaimer, the term of this patent is extended or adjusted under 35 U.S.C. 154(b) by 72 days.

(21) Appl. No.: 13/376,048

(22) PCT Filed: Jun. 14, 2010

(86) PCT No.: PCT/JP2010/060046
§ 371 (c)(1),
(2), (4) Date: Dec. 2, 2011

(87) PCT Pub. No.: WO2010/147087
PCT Pub. Date: Dec. 23, 2010

(65) Prior Publication Data
US 2012/0077670 A1 Mar. 29, 2012

(30) Foreign Application Priority Data

Jun. 19, 2009 (JP) ................. 2009-145953

(51) Int. Cl.
*B01J 37/08* (2006.01)
*B01J 21/18* (2006.01)
(Continued)

(52) U.S. Cl.
CPC ............... *B01J 37/086* (2013.01); *B01J 21/18* (2013.01); *B01J 23/42* (2013.01); *C01B 31/00* (2013.01); *C04B 35/532* (2013.01); *C04B 38/0022* (2013.01); *H01M 4/92* (2013.01);
(Continued)

(58) Field of Classification Search
None
See application file for complete search history.

(56) References Cited

U.S. PATENT DOCUMENTS

| 6,064,560 A | 5/2000 | Hirahara et al. |
| 6,228,803 B1 | 5/2001 | Gadkaree et al. |

(Continued)

FOREIGN PATENT DOCUMENTS

| CN | 1281383 A | 1/2001 |
| CN | 1931717 A | 3/2007 |

(Continued)

OTHER PUBLICATIONS

International Search Report of PCT/JP2010/060046, mailing date Sep. 14, 2010.
Ryoo, Ryong et al., "Synthesis of Highly Ordered Carbon Molecular Sieves via Template-Mediated Structural Transformation", Journal of Physical Chemistry B, Sep. 1999, pp. 7743-7746, vol. 103.
Chinese Office Action issued Mar. 11, 2013 in corresponding Chinese Patent Application No. 201080018535.1; with English translation (20 pages).

(Continued)

*Primary Examiner* — Guinever S Gregorio
(74) *Attorney, Agent, or Firm* — Westerman, Hattori, Daniels & Adrian, LLP (57) ABSTRACT

A porous carbon and a method of manufacturing the same are provided, which can inhibit metal particles from being oxidized and can keep the effect obtained by adding the metal particles for a long period of time by allowing the metal particles to disperse sufficiently.

The method is characterized by comprising the steps of: mixing a polyamic acid resin varnish 1 as a carbon precursor, magnesium oxide 2 as template particles, and chloroplatinic acid 6 as a metal salt; heat-treating the mixture in a nitrogen atmosphere at 1000° C. for 1 hour to reduce the chloroplatinic acid into platinum and thermally decomposing the polyamic acid resin to prepare a carbon 3 containing the platinum particles 7; and washing the resulting carbon 3 with a sulfuric acid solution added at a concentration of 1 mol/L to completely dissolve MgO away.

6 Claims, 9 Drawing Sheets

(51) Int. Cl.
- B01J 23/42 (2006.01)
- C01B 31/00 (2006.01)
- C04B 35/532 (2006.01)
- C04B 38/00 (2006.01)
- H01M 4/92 (2006.01)
- B01J 35/00 (2006.01)
- B01J 35/10 (2006.01)
- B01J 37/06 (2006.01)
- C04B 111/00 (2006.01)

(52) U.S. Cl.
CPC .............. *H01M 4/926* (2013.01); *B01J 35/006* (2013.01); *B01J 35/10* (2013.01); *B01J 35/1057* (2013.01); *B01J 35/1061* (2013.01); *B01J 37/06* (2013.01); *C04B 2111/0081* (2013.01); *C04B 2235/3206* (2013.01); *C04B 2235/449* (2013.01); *C04B 2235/48* (2013.01); *Y02E 60/50* (2013.01)

(56) References Cited

U.S. PATENT DOCUMENTS

| | | | |
|---|---|---|---|
| 6,248,691 | B1 | 6/2001 | Gadkaree et al. |
| 6,329,316 | B1 | 12/2001 | Ogasa et al. |
| 7,220,697 | B2* | 5/2007 | Pak et al. ................ 502/185 |
| 8,227,376 | B2 | 7/2012 | Karles et al. |
| 2007/0204870 | A1* | 9/2007 | Deevi ................ B01J 23/52 131/331 |
| 2007/0244001 | A1* | 10/2007 | Wakamatsu ............. B01J 37/16 502/303 |
| 2007/0265162 | A1 | 11/2007 | Zhang et al. |
| 2008/0280164 | A1* | 11/2008 | Atanasoski ............. B82Y 30/00 429/431 |
| 2011/0132843 | A1* | 6/2011 | Fan ................ B01J 20/02 210/668 |

FOREIGN PATENT DOCUMENTS

| | | |
|---|---|---|
| CN | 100999317 A | 7/2007 |
| JP | 2-006313 A | 1/1990 |
| JP | 9-86914 A | 3/1997 |
| JP | 2002-502792 A | 1/2002 |
| JP | 2003-104720 A | 4/2003 |
| JP | 2004-026954 A | 1/2004 |
| JP | 2005-314223 A | 11/2005 |
| JP | 2006-062954 A | 3/2006 |
| JP | 2008-13394 A | 1/2008 |
| JP | 2008-207072 A | 9/2008 |
| JP | 2009-514762 A | 4/2009 |

OTHER PUBLICATIONS

Presentation of Publications and the Like dated Jun. 9, 2014, issued in corresponding Japanese Patent Application No. 2009-56521 with English translation (12 pages).

T. Morishita et al., "Preparation of controlled pore structure carbon powders that obtained by carbon coating process", Processing of the 35th Annual Meeting of the Carbon Society of Japan, Nov. 28, 2008, Tokyo, Japan, cited in Presentation of Publications and the Like dated Jun. 9, 2014.

Office Action dated Apr. 30, 2014, issued in Corresponding Chinese Patent Application No. 201080008246.3, with English Translation (16 pages).

Taiwanese Office Action dated Jul. 22, 2014, issued in corresponding Taiwanese Patent Application No. 099119935 with English translation (25 pages).

U.S. Final Office Action dated Oct. 21, 2014, issued in related U.S. Appl. No. 13/255,201 (15 pages).

Japanese Office Action dated Dec. 11, 2013, issued in corresponding JP application No. 2009-145953, w/ English translation.

Chinese Office Action dated Oct. 17, 2013, issued in corresponding Chinese Patent Application No. 201080018535.1 with English translation (10 pages).

International Search Report dated Jun. 15, 2010, issued in related PCT/JP2010/053956.

Chinese Office Action dated Feb. 7, 2013, issued in corresponding Chinese Patent Application No. 201080008246.3, w/ English Translation (14 pages).

Chinese Office Action dated Oct. 17, 2013, issued in corresponding Chinese Patent Application No. 201080008246.3, w/ English Translation (15 pages).

Morishita, Takahiro et al., "Preparation of Porous Carbons from Thermoplastic Precursors and their Performance for Electric Double Layer Capacitors", Carbon, 2006, vol. 44, pp. 2360-2367, cited in Taiwanese Office Action dated Feb. 6, 2014 (20 pages).

Taiwanese Office Action dated Feb. 6, 2014, issued in corresponding Taiwanese Patent Application No. 099106934, w/ English Translation (20 pages).

Japanese Office Action dated Dec. 11, 2013, issued in corresponding Japanese Patent Application No. 2009-056521, w/ English Translation (11 pages).

Office Action dated Sep. 19, 2013, issued in related U.S. Appl. No. 13/255,201.

Office Action dated Jan. 24, 2014, issued in related U.S. Appl. No. 13/255,201.

Office Action dated Jun. 17, 2014, issued in related U.S. Appl. No. 13/255,201.

Notice of Allowance and Fees dated Jun. 17, 2015, issued in U.S. Appl. No. 13/255,201 (6 pages).

* cited by examiner

POROUS CARBON AND METHOD OF MANUFACTURING SAME

TECHNICAL FIELD

The present invention relates to a porous carbon and a method of manufacturing the same. More particularly, the invention relates to a porous carbon containing metallic particles therein and a method of manufacturing the same.

BACKGROUND ART

Porous carbon containing metal particles is a catalyst with high industrial value. For example, it can adsorb a reactant by making use of the high adsorption capability of activated carbon, and cause the reactant to react with the metal particles as a catalyst. Known examples of the metal particles include platinum, silver, and copper. Examples of the applications thereof include highly active electrodes for fuel cells, NOx/Sox decomposition filters, and electrode materials for lithium-ion secondary batteries.

As the porous carbon material containing metal particles, one in which metal particles are dispersed on the surface and inside the pores of the carbon carrier finely in the order of nanometers has been proposed. As a method of manufacturing the porous carbon material, a method has been proposed including mixing metal particles or the like, a surfactant, a thermosetting resin or the like, and a solvent together, heating and curing the mixture, and thereafter sintering it to carbonize it. (See Patent Document 1 below).

CITATION LIST

[Patent Documents]
[Patent Document 1]
Japanese Published Unexamined Patent Application No. 2005-314223 A

SUMMARY OF THE INVENTION

Problems to be Solved by the Invention

However, according to the just-mentioned conventional method, metal particles exist on the surface and in the pores of the carbon carrier, which means that the surfaces of the metal particles are exposed. As a consequence, problems arise that, for example, when the carbon material is used for a long period of time, the metal particles are oxidized, and the function thereof as the catalyst is degraded. Moreover, there is another problem that the dispersion of metal particles using the electrostatic effect of the surfactant may not cause the metal particles to disperse sufficiently.

Accordingly, it is an object of the present invention to provide a porous carbon that can inhibit oxidization of the metal particles and can keep the effect of adding the metal particles for a long period of time by dispersing the metal particles sufficiently. It is also an object of the invention to provide a method of manufacturing such a porous carbon.

Means for Solving the Problems

A porous carbon of the invention has a carbonaceous wall constituting an outer wall of mesopores, the carbonaceous wall forming a three-dimensional network structure, and micropores each formed in a position in the carbonaceous wall that faces the mesopores, the porous carbon being characterized in that: metal particles are dispersed in the carbonaceous wall, and at least a portion of the metal particles is arranged in such a state that a portion of the surface of the particle is exposed in the micropores.

When the metal particles are dispersed in the carbonaceous wall as in the just-described configuration, at least a portion of the surface of the metal particle is covered with the carbonaceous substance, and therefore, the metal particles are inhibited from being oxidized in comparison with the exposed state in which metal particles are fully exposed. As a result, the effect obtained by adding the metal particles can be kept over a long period of time. On the other hand, because at least a portion of the metal particles is arranged in such a state that a portion of the surface of the particle is exposed in the micropores, the function of the metal particles as a catalyst, for example, can be fully exhibited.

When the carbonaceous wall constituting the outer wall of the mesopores forms a three-dimensional network structure and also the micropores are formed at positions in the carbonaceous wall that face the mesopores as described above, the effective adsorption area per unit amount can be increased, or the amount of capillary condensation in the pores can be increased. Moreover, when the carbonaceous wall constituting the outer wall of the mesopores forms a three-dimensional network structure, the porous carbon can be used suitably even in the case where the porous carbon needs to have flexibility.

In the present specification, the pores having a pore diameter of less than 2 nm are referred to as "micropores," the pores having a pore diameter of from 2 nm to 50 nm are referred to as "mesopores," and the pores having a pore diameter of greater than 50 nm are referred to as "macropores." In addition, all of these pores may be generically referred to as "pores."

Examples of the material used for the metal particles include platinum, silver, copper, tin, and iron. When platinum is used, the porous carbon can be used as, for example, a highly active electrode for fuel cells and a $NO_x/SO_x$ decomposition filter. When silver is used, the porous carbon can be used as, for example, an adsorbent for $NO_x$ and $SO_x$ in automobile emission gas and a gas/liquid sterile filter. When copper is used, the porous carbon can be used as, for example, an ammonia-gas adsorption/decomposition catalyst and a brush material filler. When tin is used, the porous carbon can be used as, for example, a low melting point solder powder and an electrode material for lithium-ion secondary batteries. When iron is used, the porous carbon can be used as, for example, a catalyst for organic synthesis and a brush material filler.

It is desirable that the mesopores have substantially the same size.

When the mesopores are configured to have substantially the same size as each other, the porous carbon can serve the purposes sufficiently in the case where the porous carbon is used for the purposes of purifying or catalyst, for example.

It is desirable that the metal particles have an average particle diameter of from 4 nm to 500 nm.

If the average particle size of the metal particles is less than 4 nm, the problem arises that the metal particles tend to be buried in the carbon wall, and moreover, such problems arise that size variations occur and that the catalyst capability and the characteristics as the metal may not be exhibited because the crystal structure cannot be maintained and amorphization takes place. On the other hand, if the average particle size of the metal particles exceeds 500 nm, the metal particles are not covered sufficiently by the carbon wall because the metal particles are deposited separately from the carbonaceous substance, and moreover, the catalyst capability lowers because the specific surface area of the metal particles decreases.

It should be noted that the just-mentioned average particle diameter is a value determined by a dynamic light scattering method.

It is desirable that the amount of the metal particles be from 0.5 weight % to 90 weight % with respect to the total amount of the carbon constituting the carbonaceous wall and the metal particles.

If the amount of the metal particles is less than 0.5 mass %, the effect obtained by adding the metal particles is not exhibited sufficiently. On the other hand, it is difficult to produce a porous carbon in which the amount of the metal particles exceeds 90 mass %.

It is desirable that the pore diameter of the pores including the mesopores and the micropores be from 0.3 nm to 100 nm.

It is difficult to fabricate a porous carbon with a pore diameter of less than 0.3 nm. On the other hand, if the pore diameter exceeds 100 nm, the amount of the carbonaceous wall per unit volume is so small that the three-dimensional network structure may not be retained.

It is desirable that the specific surface area be from 100 $m^2/g$ to 1000 $m^2/g$.

If the specific surface area is less than 100 $m^2/g$, the amount of the pores formed is insufficient, so the three-dimensional network structure does not form. On the other hand, if the specific surface area exceeds 1000 $m^2/g$, the shape of the carbonaceous wall cannot be retained, and the particles may be disintegrated.

It is desirable that the mesopores be open pores, and that the hollow portions be connected to each other.

When the hollow portions are connected to each other, gas flow becomes smoother, so the porous carbon can capture gas more easily.

A method according to the invention is characterized by comprising the steps of: mixing template particles, metal particles, and a flowable material containing an organic resin, to prepare a mixture: sintering the mixture in a non-oxidizing atmosphere to prepare a sintered substance; and removing the template particles from the sintered substance.

The just-described method makes it possible to fabricate a porous carbon as described above. In this case, when forming the carbonaceous wall by sintering the mixture in a non-oxidizing atmosphere, the template particles exist in the regions that later become mesopores, so the metal particles are not dispersed in those regions. Even when a metal having a low melting point (a metal having a melting point lower than the temperature during the sintering) is used for the metal particles, the metal particles can be inhibited from melting away from the carbonaceous wall even though the metal particles may be melted during the sintering because the metal particles are enclosed between the template particles together with the flowable material, as long as the template particles exist as described above. Furthermore, when the template particles exist, the thickness of the carbonaceous wall becomes small during the sintering. As a result, the metal particles can be inhibited from aggregating in the carbonaceous wall, and the metal particles can be dispersed in the carbonaceous wall nanoscopically.

In order to obtain the above-described advantageous effects smoothly, it is desirable that the amount of the template particles be from 30 wt % to 80 wt % with respect to the total amount of the flowable material, the metal particles, and the template particles. The reason is as follows. If the amount of the template particles is too small, the effect obtained by adding the template particles may not be obtained sufficiently. On the other hand, if the amount of the template particles is too large, such a problem may arise that the thickness of the carbonaceous wall becomes too thin.

A method according to the invention is characterized by comprising the steps of: mixing template particles, a metal component, and a flowable material containing an organic resin, the metal component containing a metal salt that is deposited as a metal when sintered in a reducing atmosphere, to prepare a mixture; sintering the mixture in a reducing atmosphere to prepare a sintered substance; and removing the template particles from the sintered substance.

The just-described method makes it possible to fabricate a porous carbon as described above. In this case, when the metal particles alone are used as the metal component in the step of preparing the mixture, the mixture may be sintered in a non-oxidizing atmosphere in the step of preparing the sintered substance. However, when a substance containing a metal salt is used as the metal component, it is necessary that the mixture be sintered in a reducing atmosphere in the step of preparing the sintered substance. It should be noted that the metal component may contain metal particles in addition to the metal salt.

Figure 11:
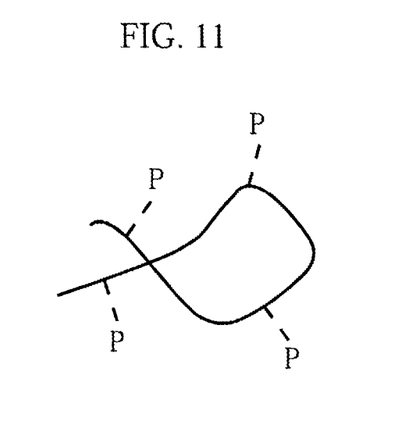
FIG. 11 is a conceptual view illustrating the condition in which a complex is formed by a resin varnish and a metal salt.

When a resin varnish is used as the flowable material in the just-described manufacturing method, a complex of the resin varnish and the metal salt is formed as illustrated in the conceptual view of FIG. 11.

A method according to the invention is characterized by comprising the steps of: mixing template particles and a flowable material comprising an organic resin containing a metal atom in its structure, to prepare a mixture; sintering the mixture in a non-oxidizing atmosphere to prepare a sintered substance; and removing the template particles from the sintered substance.

Figure 10:
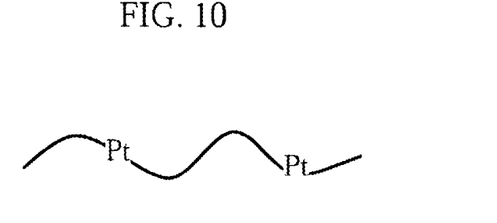
FIG. 10 is a conceptual view illustrating the condition of a polymer material containing metal atoms in the structure.

As the method for causing a metal to be contained as microparticles, it is also possible to use a polymer material containing a metal atom in its structure, in addition to the foregoing methods. For example, the above-described porous carbon can be obtained by using a polymer material containing platinum in the structure thereof, such as carboplatin (see the conceptual view of FIG. 10).

It is desirable that the template particles have substantially the same diameter.

When using the template particles having substantially the same diameter as each other, the sizes of the mesopores will become substantially the same as each other.

It is desirable that the flowable material be a resin showing flowability at a temperature of 200° C. or lower, or a varnish-like polymer resin.

When a resin showing flowability at a temperature of 200° C. or lower, or a varnish-like polymer resin is used as the flowable material, the above-described porous carbon can be fabricated more easily.

However, the flowable material is not limited to a resin or the like showing flowability at a temperature of 200° C. or lower. Even if the flowable material does not show flowability at a temperature of 200° C. or lower, the flowable material may be used in the present invention as long as the flowable material is a polymer material soluble in water or an organic solvent. Examples of such a material include PVA (polyvinyl alcohol), PET (polyethylene terephthalate) resin, imide-based resin, and phenolic resin.

(Other Embodiments)

(1) It is preferable that the flowable material have a carbon yield of from 40% to 85%. The reason is as follows. If the carbon yield of the flowable material is excessively small or excessively large (more specifically, if the carbon yield of the flowable material is less than 40% or greater than 85%), carbon powder in which the three-dimensional network structure cannot be retained may be produced. In contrast, by using a flowable material having a carbon yield of from 40% to 85%, it is possible to reliably obtain a porous carbon having a three-dimensional network structure in which continuous pores are formed in the locations where the template particles have existed after removing the template particles. Moreover, when the template particles having substantially the same particle diameter as each other are used, continuous pores having the same size are formed, and therefore, a spongy and substantially cage-like porous carbon can be fabricated.

In addition, when the carbon yield of the flowable material is within the foregoing range, the micropores develop greatly, so the specific surface area becomes large. However, even if the carbon yield of the flowable material is within the foregoing range, micropores do not develop in the case where no template particle is used.

(2) The diameter of the pores, the pore distribution of the porous carbon, and the thickness of the carbonaceous wall can be adjusted by varying the diameter of the template particles and the type of the organic resin. Therefore, by appropriately selecting the diameter of the template particles and the type of the organic resin, it becomes possible to fabricate a porous carbon having more uniform pore diameters and a greater pore capacity. Moreover, because the flowable material containing an organic resin is used as the carbon source and moreover the porous carbon can be fabricated without an activation treatment process, the resultant porous carbon will have a very high purity.

(3) It is desirable to use an alkaline-earth metal compound as the template particles. The reason is as follows. The alkaline-earth metal compound can be removed by a weak acid or hot water (that is, the template particles can be removed without using a strong acid), and therefore, the properties of the porous carbon itself can be prevented from changing in the step of removing the template particles. The use of a weak acid has an advantage that the speed of the removing becomes faster. On the other hand, the use of hot water has an advantage that it is possible to prevent the acid from remaining as an impurity. In addition, the oxide solution in which the oxide is dissolved in the step of removing the template particles can be re-used as a source material, so the manufacturing cost of the porous carbon can be reduced.

(4) In the step of removing the template particles, it is desirable that the remaining ratio of the template particles after the removing be restricted to 0.5% or less. The reason is that when the remaining ratio of the template particles after the removing exceeds 0.5%, the region that cannot serve the role of the pores forms in a wide area because the amount of the template particles remaining in the mesopores is large. In addition, there is a risk that the porous carbon may not be suitably used for the applications in which metal impurities should be avoided.

Advantages Of The Invention

The present invention achieves the significant advantageous effects of inhibiting oxidization of the metal particles and maintaining the effect obtained by adding the metal particles for a long period of time by dispersing the metal particles sufficiently.

BRIEF DESCRIPTION OF THE DRAWINGS

FIG. 1 illustrates a process of manufacturing the present invention carbon, wherein: FIG. 1(a) is an illustrative view showing a mixture of polyamic acid resin varnish, magnesium oxide, and chloroplatinic acid; FIG. 1(b) is an illustrative view showing the mixture that has been heat-treated, and FIG. 1(c) is an illustrative view a porous carbon.

FIG. 3 shows SEM (scanning electron microscope) photographs of the present invention carbon A1 before and after the magnesium oxide is removed, wherein FIG. 3(a) is a photograph before the magnesium oxide is removed, and FIG. 3(b) is a photograph after the magnesium oxide has been removed.

BEST MODE FOR CARRYING OUT THE INVENTION

Hereinbelow, embodiments of the present invention will be described.

A carbonized substance of the present invention is obtained by wet-blending or dry-blending a polyimide containing at least one nitrogen or fluorine atom in its unit structure or a resin having a carbon yield of higher than 40 wt % (such as a phenolic resin or a pitch), metal particles, and oxide particles in a solution or powder state, then carbonizing the mixture under a non-oxidizing atmosphere, a reduced pressure [133 Pa (1 torr) or less], or a reducing atmosphere at a temperature of 500° C. or higher, and washing the resultant carbon and oxide. In the carbonized substance of the present invention, the metal particles are dispersed within the carbonaceous wall.

Here, the polyimide containing at least one nitrogen or fluorine atom in its unit structure can be obtained by polycondensation of an acid component and a diamine component. However, in this case, it is necessary that either one of or both of the acid component and the diamine component contain at least one nitrogen atom or fluorine atom.

Specifically, a polyamic acid, which is the precursor of the polyimide, is deposited, and the solvent is removed by heating, to obtain a polyamic acid film. Next, the obtained polyamic acid film is subjected to heat imidization at 200° C. or higher, so that the polyimide can be fabricated.

Examples of the diamine include: aromatic diamines including:
2,2-Bis(4-aminophenyl)hexafluoropropane, 2,2'-Bis(trifluoromethyl)-benzidine, and 4,4'-diaminooctafluorobiphenyl; and 3,3'-difluoro-4,4'-diaminodiphenylmethane, 3,3'-difluoro-4,4'-diaminodiphenylether, 3,3'-di(trifluoromethyl)-4,4'-diaminodiphenylether, 3,3'-difluoro-4,4'-diaminodiphenylpropane, 3,3'-difluoro-4,4'-diaminodiphenylhexafluoropropane, 3,3'-difluoro-4,4'-diaminobenzophenone, 3,3',5,5'-tetrafluoro-4,4'-diaminodiphenylmethane, 3,3',5,5'-tetra(trifluoromethyl)-4,4'-diaminodiphenylmethane, 3,3',5,5'-tetrafluoro-4,4'-diaminodiphenylpropane, 3,3',5,5'-tetra(trifluoromethyl)-

4,4'-diaminodiphenylpropane, 3,3',5,5'-tetrafluoro-4,4-diaminodiphenylhexafluoropropane, 1,3-diamino-5-(perfluorononenyloxy)benzene, 1,3-diamino-4-methyl-5-(perfluorononenyloxy)benzene, 1,3-diamino-4-methoxy-5-(perfluorononenyloxy)benzene, 1,3-diamino-2,4,6-trifluoro-5-(perfluorononenyloxy)benzene, 1,3-diamino-4-chloro-5-(perfluorononenyloxy)benzene, 1,3-diamino-4-pbromo-5-(perfluorononenyloxy)benzene, 1,2-diamino-4-(perfluorononenyloxy)benzene, 1,2-diamino-4-methyl-5-(perfluorononenyloxy)benzene, 1,2-diamino-4-methoxy-5-(perfluorononenyloxy)benzene, 1,2-diamino-3,4,6-trifluoro-5-(perfluorononenyloxy)benzene, 1,2-diamino-4-chloro5-(perfluorononenyloxy)benzene, 1,2-diamino-4-bromo-5-(perfluorononenyloxy)benzene, 1,4-diamino-3-(perfluorononenyloxy)benzene, 1,4-diamino-2-methyl-5-(perfluorononenyloxy)benzene, 1,4-diamino-2-methoxy-5-(perfluorononenyloxy)benzene, 1,4-diamino-2,3,6-trifluoro-5-(perfluorononenyloxy)benzene, 1,4-diamino-2-chloro-5-(perfluorononenyloxy)benzene, 1,4-diamino-2-pbromo-5-(perfluorononenyloxy) benzene, 1,3-diamino-5-(perfluorohexenyloxy)benzene, 1,3-diamino-4-methyl-5-(perfluorohexenyloxy)benzene, 1,3-diamino-4-methoxy-5-(perfluorohexenyloxy)benzene, 1,3-diamino-2,4,6-trifluoro-5-(perfluorohexenyloxy)benzene, 1,3-diamino-4-chloro-5-(perfluorohexenyloxy)benzene, 1,3-diamino-4-bromo-5-(perfluorohexenyloxy)benzene, 1,2-diamino-4-(perfluorohexenyloxy)benzene, 1,2-diamino-4-methyl-5-(perfluorohexenyloxy)benzene, 1,2-diamino-4-methoxy-5-(perfluorohexenyloxy)benzene, 1,2-diamino-3,4,6-trifluoro-5-(perfluorohexenyloxy)benzene, 1,2-diamino-4-chloro-5-(perfluorohexenyloxy)benzene, 1,2-diamino-4-bromo-5-(perfluorohexenyloxy)benzene, 1,4-diamino-3-(perfluorohexenyloxy)benzene, 1,4-diamino-2-methyl-5-(perfluorohexenyloxy)benzene, 1,4-diamino-2-methoxy-5-(perfluorohexenyloxy)benzene, 1,4-diamino-2,3,6-trifluoro-5-(perfluorohexenyloxy)benzene, 1,4-diamino-2-chloro-5-(perfluorohexenyloxy)benzene, 1,4-diamino-2-bromo-5-(perfluorohexenyloxy)benzene; and p-phenylenediamine (PPD) and dioxydianiline, which do not contain fluorine atoms. It is also possible that two or more of the foregoing aromatic diamines may be used in combination as the diamine component.

Examples of the acid component include: 4,4'-(hexafluoroisopropylidene)diphthalic anhydride (6FDA), which contains fluorine atoms; and 3,4,3',4'-biphenyltetracarboxylic dianhydride (BPDA) and pyromellitic dianhydride (PMDA), which contains no fluorine atom.

Examples of the organic solvent used as the solvent for the polyimide precursor include N-methyl-2-pyrrolidone and dimethylformamide.

The technique for imidization may follow either heat imidization or chemical imidization as indicated by known methods [for example, see "Shin Kobunshi Jikkengaku, 3, Kobunshi no Gosei•Hanno (2)" (Experimental Polymer Science, New Edition, 3, Synthesis and reaction of polymer [2]), edited by Society of Polymer Science, Japan, Kyoritsu Shuppan, Tokyo, Mar. 28, 1996, p. 158]. The present invention is not limited to this method of imidization.

Furthermore, it is possible to use a resin having a carbon yield of 40% or higher, such as petroleum-based tar pitch and an acrylic resin, other than the polyimide.

Examples of the source material used as the above-mentioned oxide include alkaline-earth metal oxides (such as magnesium oxide and calcium oxide). It is also possible to use metal chlorides, metal nitrates, metal sulfates, and metal organic acids (such as magnesium citrate, magnesium oxalate, calcium citrate, and calcium oxalate), the state of which changes into magnesium oxide during the thermal decomposition process by a heat treatment.

As the cleaning solution for removing the oxide, it is preferable to use a dilute acid of 2 mol/L or lower of a common inorganic acid, such as hydrochloric acid, sulfuric acid, nitric acid, citric acid, acetic acid, and formic acid. It is also possible to use hot water of 80° C. or higher.

Furthermore, in order to obtain the porous carbon of the present invention, it is preferable that the carbonization be performed under a non-oxidizing atmosphere at a temperature of from 500° C. to 1500° C. The reason is as follows. Because the resin having a high carbon yield is a polymer, the carbonization is insufficient and the pores do not develop sufficiently at a temperature of less than 500° C. On the other hand, at a temperature of higher than 1500° C., the shrinkage is great and the oxide is sintered and made into a large size; therefore, the pore size becomes small and the specific surface area becomes small.

EXAMPLES

First Group of Examples

Example

Figure 1:
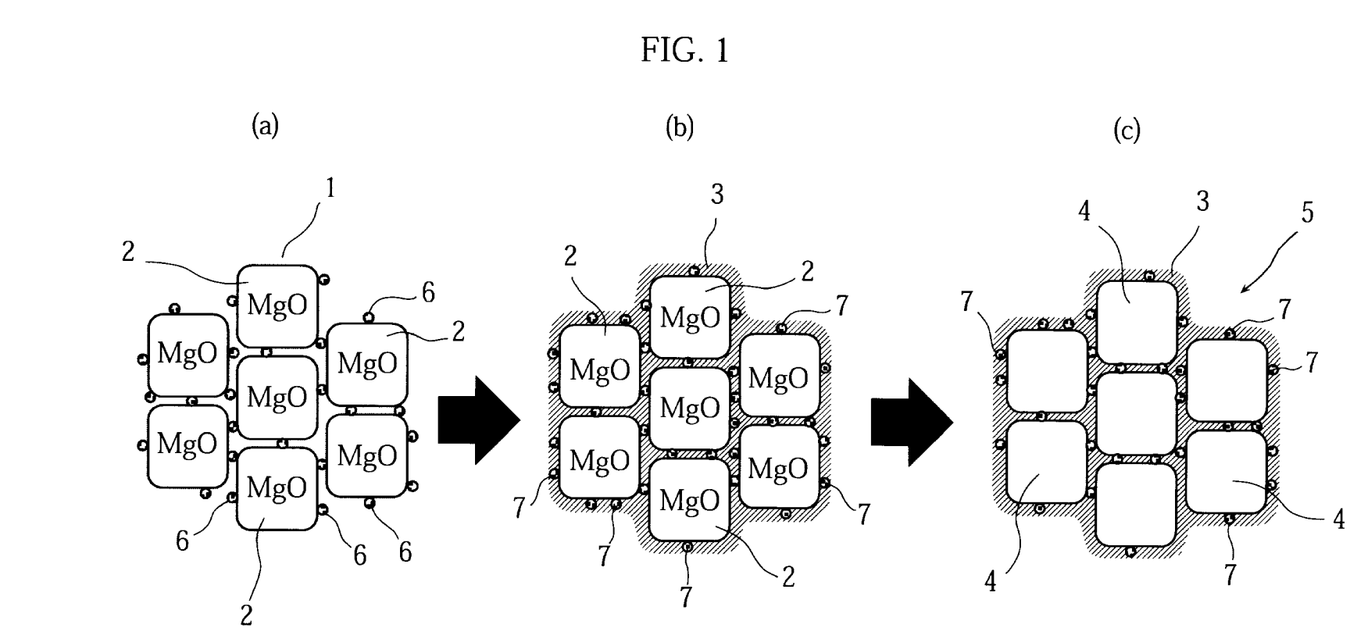

First, as illustrated in FIG. 1(a), a polyamic acid resin vanish 1 (imide-based resin) as a carbon precursor, magnesium oxide 2 (MgO, average crystallite size 100 nm) as template particles, and chloroplatinic acid 6 as a metal salt were mixed at a mass ratio of 10:5:1. At this time, the polyamic acid resin varnish and the chloroplatinic acid 6 formed a metal complex. Next, as illustrated in FIG. 1(b), the mixture was heat-treated in a nitrogen atmosphere at 1000° C. for 1 hour, to reduce the chloroplatinic acid 6 into platinum and allow the polyamic acid resin to undergo heat decomposition, whereby a carbon 3 containing platinum particles 7 was prepared. Lastly, as illustrated in FIG. 1(c), the resultant carbon 3 was washed with a sulfuric acid solution added at a concentration of 1 mol/L, to dissolve the MgO away completely, whereby a porous carbon 5 having a multiplicity of pores 4 was obtained. In the porous carbon 5, the amount of the platinum particles 7 was 5 mass % with respect to the total amount of the carbon constituting the carbonaceous wall and the platinum particles 7.

The porous carbon fabricated in this manner is hereinafter referred to as a present invention carbon A1.

Figure 2:
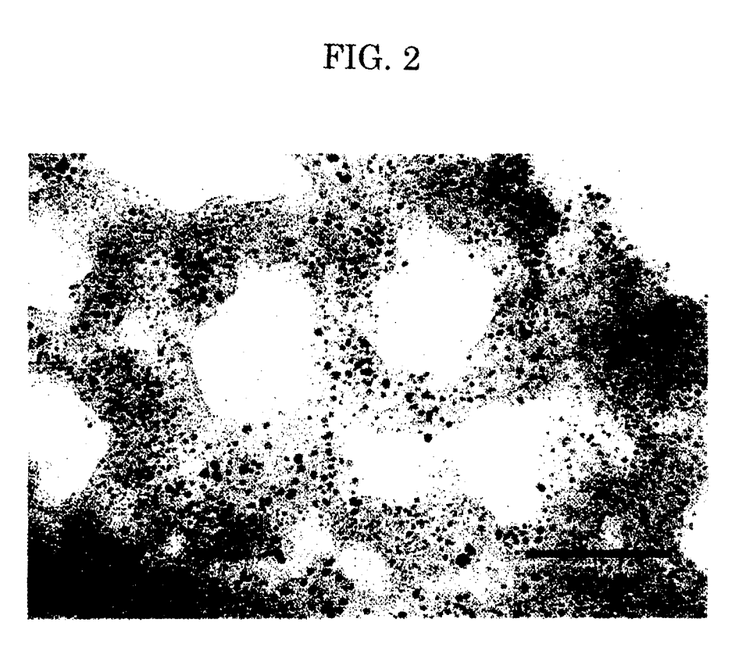
FIG. 2 is a STEM (scanning transmission electron microscope) photograph of a present invention carbon A1.
Figure 3:
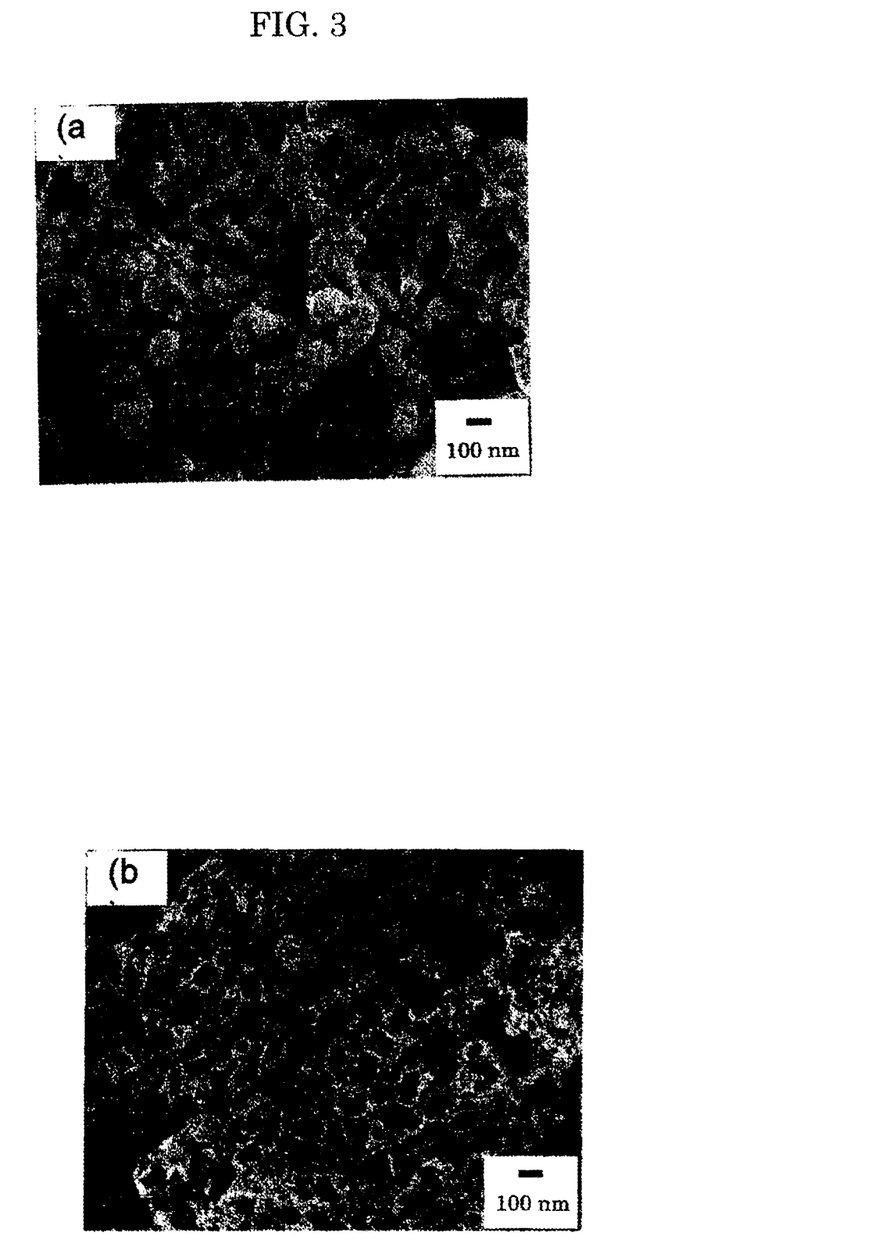
Figure 4:
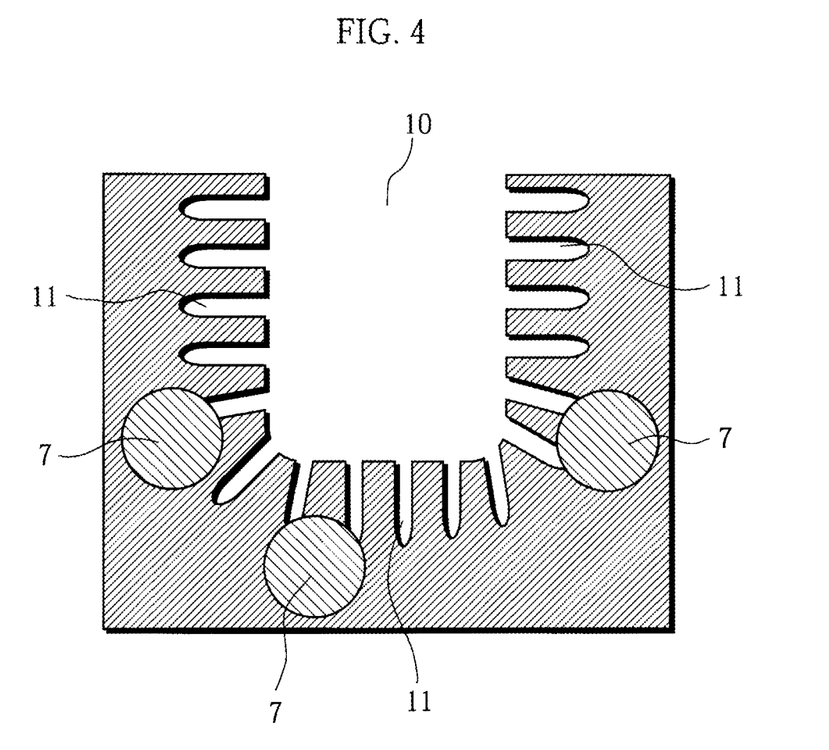
FIG. 4 is a schematic view illustrating the condition of a present invention carbon.

A STEM (scanning transmission electron microscope) photograph of the present invention carbon A1 is shown in FIG. 2. As clearly seen from FIG. 2, it is observed that the platinum particles are dispersed in the order of nanometers in the porous carbon. For the present invention carbon A1, SEM (scanning electron microscope) photographs thereof before and after removing the magnesium oxide are shown in FIG. 3(a) [before the magnesium oxide is removed] and FIG. 3(b) [after the magnesium oxide has been removed], respectively. As clearly seen from the two figures, it is observed that the three-dimensional network structure is not formed before removing the magnesium oxide, whereas the three-dimensional network structure (spongy carbon form) is formed after removing the magnesium oxide. More specifically, as illustrated in FIG. 4, the present invention carbon A1 has the following a structure. It has a large number of mesopores 10 having almost the same size as each other, and micropores 11 are formed at the positions in a carbonaceous wall 12 that face the mesopores 10. In addition, the platinum particles 7 exist in the carbonaceous wall 12, and a portion of the platinum particles 7 is exposed in the micropores 11.

In the present invention carbon A1, the volume of the carbon portion was found to be 40% based on the total volume of the carbonaceous wall, the pore diameter of the micropores was 10 nm, and the specific surface area was 700 m$^2$/g. The pore diameter of the micropores was calculated using the HK method, and the pore diameter of the mesopores was calculated using the BJH method.

Examples 2 to 8

Porous carbons were fabricated in the same manner as described in Example 1 above, except that the amount of the platinum particles 7 was set at 10 mass %, 15 mass %, 20 mass %, 30 mass %, 35 mass %, 45 mass %, and 65 mass %, respectively, with respect to the total amount of the carbon constituting the carbonaceous wall 12 and the platinum particles 7.

The porous carbons fabricated in these manners are hereinafter referred to as present invention porous carbons A2 to A8, respectively.

Comparative Examples 1 to 4

Porous carbons were fabricated in the same manners as described in Examples 1 to 4 above, except that no magnesium oxide as the template particles was added.

The porous carbons fabricated in these manners are hereinafter referred to as comparative carbons Z1 to Z4, respectively.

Experiment

The relationship between the platinum content (the amount of the platinum particles 7 with respect to the total amount of the carbon constituting the carbonaceous wall 12 and the platinum particles 7) and the average particle diameter of the platinum was studied for the present invention carbons A1 to A8 as well as the comparative carbons Z1 to Z4. The results are shown in FIG. 5.

Figure 5:
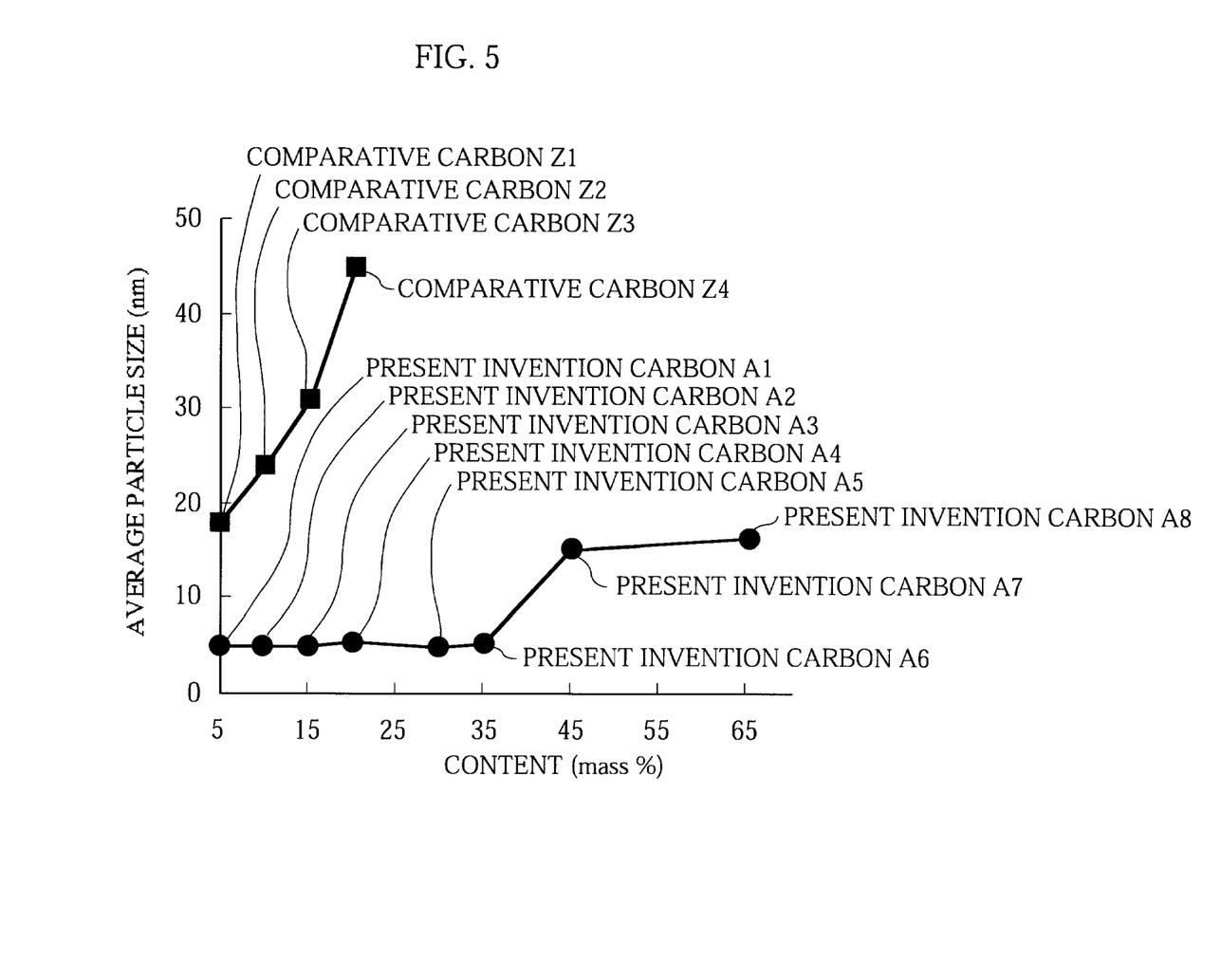
FIG. 5 is a graph illustrating the relationship between the platinum content and the average particle size of platinum in present invention carbons A1 to A8 and comparative carbons Z1 to Z4.

As clearly seen from FIG. 5, the present invention carbons A1 to A6, which have a platinum content of from 5 mass % to 35 mass %, have an extremely small platinum particle diameter, about 5 nm. Even the present invention carbons A7 and A8, which have a platinum content of 45 mass % and 65 mass %, respectively, have a small platinum particle diameter, about 17 nm. In contrast, as for the comparative carbons Z1 to Z4, it is observed that even the comparative carbon Z1, which has a platinum content of 5 mass %, has a large platinum particle diameter, about 18 nm, and the comparative carbons Z2 to Z4, which have a platinum content of 10 mass % or higher, have an extremely large platinum particle diameter, about 23 nm or larger.

Although the reason is not clearly understood, it is believed that the reason is as follows. When the MgO filler is used as in the present invention carbons A1 to A8, the thickness of the carbon wall is kept small throughout the manufacturing process by the MgO filler to such a degree as not to permit the platinum particles to aggregate. Therefore, the metal particles are kept in a state in which the metal particles are dispersed nanoscopically in the carbon wall of the porous carbon. In contrast, the comparative carbons Z1 to Z4 do not use the MgO filler. Therefore, it is believed that aggregation of the platinum particles takes place in the polyamic acid resin varnish during the heat treatment and the average particle diameter of platinum becomes large.

Second Group of Examples

Example

First, polyvinyl alcohol as a carbon precursor, magnesium oxide (MgO, average crystallite size 100 nm) as template particles, and tin oxide as a metal salt were mixed at a mass ratio of 10:10:5. Next, the mixture was heat-treated in a nitrogen atmosphere at 1000° C. for 1 hour, to reduce the tin oxide into tin and allow the polyvinyl alcohol to undergo heat decomposition, whereby a carbon containing tin was prepared. Lastly, the resultant carbon was washed with a hydrochloric acid solution added at a concentration of 1 mol/L, to dissolve the MgO away completely, whereby a porous carbon having a multiplicity of pores was obtained. In the resultant porous carbon, the amount of the tin was 55 wt % with respect to the total amount of the carbon constituting the carbonaceous wall and the tin.

The porous carbon fabricated in this manner is hereinafter referred to as a present invention carbon B.

Figure 6:
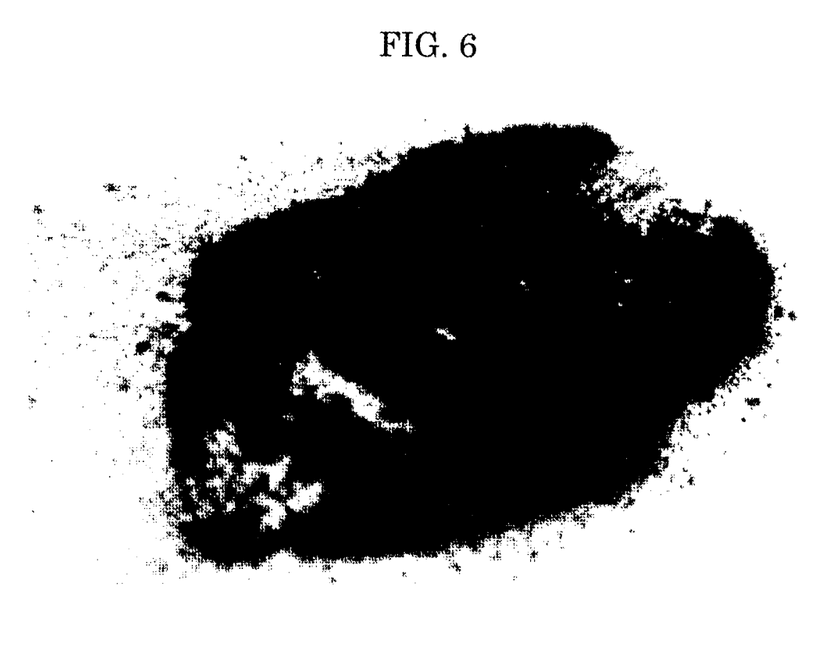
FIG. 6 is a photograph showing the outer appearance of a present invention carbon B.

A photograph showing the outer appearance of the present invention carbon B is shown in FIG. 6. As clearly seen from FIG. 6, no metal deposition is observed, and it is believed that tin particles are dispersed in the order of nanometers in the porous carbon.

Comparative Example

A porous carbon was fabricated in the same manner as described in the just-described example, except that no magnesium oxide as the template particles was added.

The porous carbon fabricated in this manner is hereinafter referred to as a comparative carbon Y.

Figure 7:
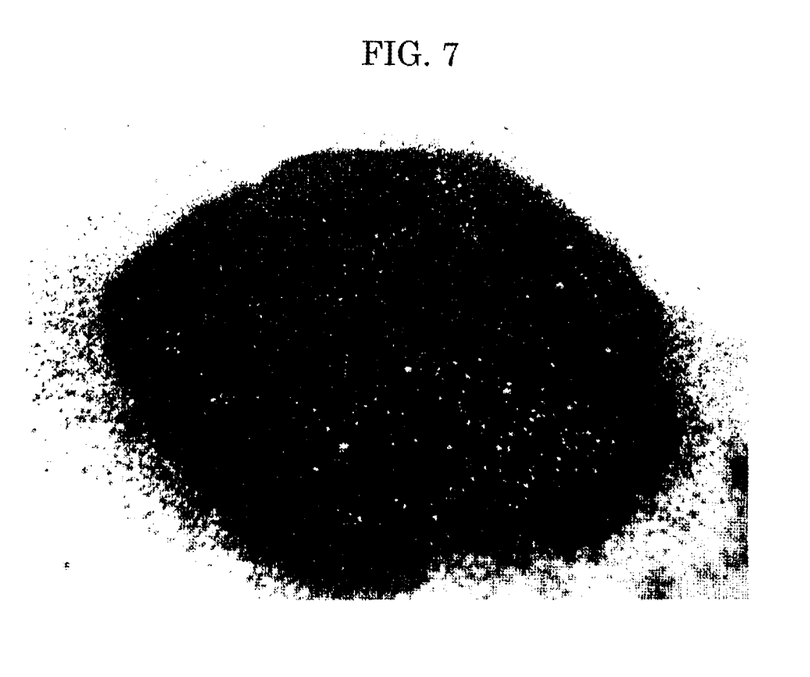
FIG. 7 is a photograph showing the outer appearance of a comparative carbon Y.

A photograph showing the outer appearance of the comparative carbon Y is shown in FIG. 7. The white particles in the photograph show deposited metal. As clearly seen from FIG. 7, it is observed that the tin particles are aggregated and deposited outside the porous carbon.

The reason why the just-described outer appearance is observed is as follows. When the MgO filler is used as in the present invention carbon B, the state in which the metal particles are enclosed in the carbon wall of the porous carbon is maintained even during the sintering. Therefore, the metal is not deposited outside the porous carbon. In other words, the presence of the MgO filler can prevent the metal from melting and flowing out into the mesopores. In contrast, the comparative carbon Y does not use the MgO filler. Therefore, it is believed that, during the sintering at a temperature higher than the melting point of the metal particles, the melted metal flows out into the mesopores.

Experiment

Samples of the same mixture as the mixture used in the above-described Example were heat-treated in a nitrogen atmosphere for 1 hour at 600° C., 700° C., 800° C., and 900° C., respectively. Thereafter, the samples were washed with a hydrochloric acid solution to dissolve the MgO away completely. The samples of the carbons before and after washing with the hydrochloric acid solution were analyzed by X-ray diffraction analysis. The results are shown respectively in FIG. 8 (before washing with the hydrochloric acid solution) and FIG. 9 (after washing with the hydrochloric acid solution).

Figure 8:
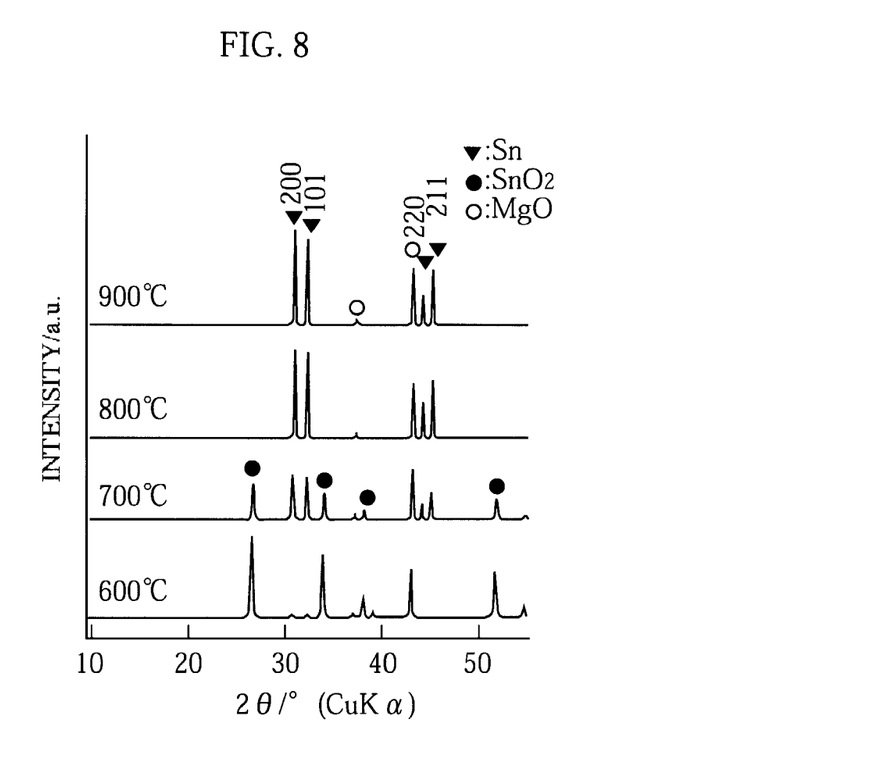
FIG. 8 is an X-ray diffractogram of the carbon before being washed by a hydrochloric acid solution.
Figure 9:
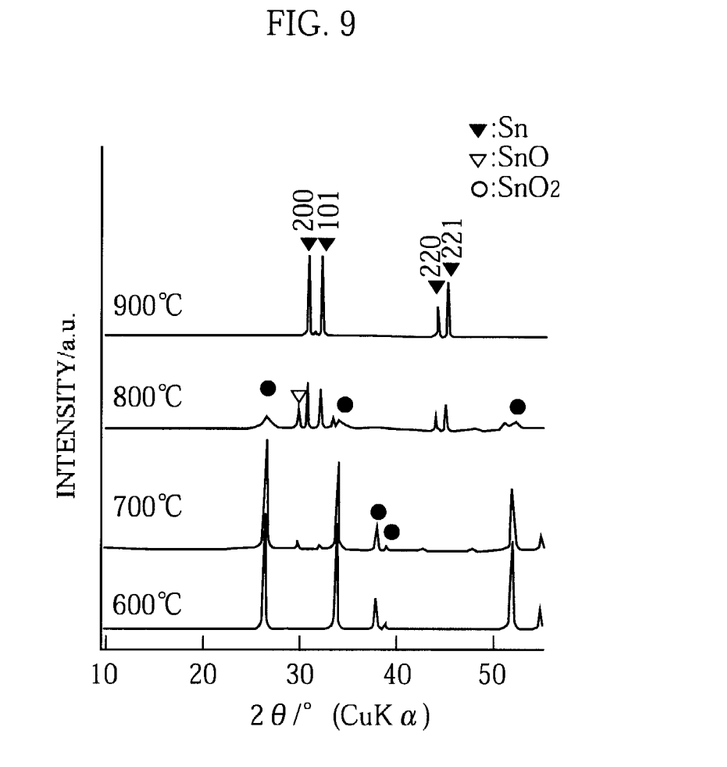
FIG. 9 is an X-ray diffractogram of the carbon after having been washed by a hydrochloric acid solution.

As clearly seen from FIGS. 8 and 9, it is observed that when the heat treatment was conducted at 700° C. or lower, $SnO_2$ were present both before and after the washing with the hydrochloric acid solution. Also, it is observed that when the heat treatment was conducted at 800° C., $SnO_2$ was absent before the washing with the hydrochloric acid solution but $SnO_2$ was present after the washing with the hydrochloric acid solution. On the other hand, when the heat treatment was conducted at 900° C. or higher, it is observed that $SnO_2$ was absent both before and after the washing with the hydrochloric acid solution. Therefore, it is understood that it is preferable that the heat-treatment temperature be 900° C. or higher when tin oxide is used as the metal salt, in order to carry out the reducing treatment of the tin oxide reliably.

INDUSTRIAL APPLICABILITY

The present invention can be used as, for example, a gas adsorbent material, a gas decomposition material, a highly active electrode for fuel cell, a gas/liquid sterile filter, a brush material filler, a low melting point solder powder, and an electrode material for lithium-ion secondary batteries.

DESCRIPTION OF REFERENCE NUMERALS

1—Polyamic acid resin varnish (Imide-based resin)
2—Magnesium oxide
3—Carbon
4—Pore
5—Porous carbon
6—Chloroplatinic acid
7—Platinum particle

The invention claimed is:

1. A porous carbon having a carbonaceous wall constituting an outer wall of mesopores, the carbonaceous wall forming a three-dimensional network structure, and micropores each formed in a position in the carbonaceous wall that faces the mesopores, characterized in that:

metal particles are dispersed in the carbonaceous wall, and
    at least a portion of the metal particles is buried in the carbonaceous wall in such a state that a portion of the surface of the particle is exposed in the micropores, thereby inhibiting oxidization of the metal particles.

2. The porous carbon according to claim 1, wherein the metal particles have an average particle size of from greater than 5 nm and not greater than 500 nm, as determined by a dynamic light scattering method.

3. The porous carbon according to claim 1, wherein the amount of the metal particles is from 0.5 wt % to 90 wt % with respect to the total amount of the carbon constituting the carbonaceous wall and the metal particles.

4. The porous carbon according to claim 1, wherein the pore diameter of the pores including the mesopores and the micropores is from 0.3 nm to 100 nm.

5. The porous carbon according to claim 1, wherein the specific surface area is from 100 $m^2/g$ to 1000 $m^2/g$.

6. The porous carbon according to claim 1, wherein the mesopores are open pores, and the hollow portions are connected to each other.

* * * * *